4292X
A. Babcock,
Piano Frame,
Patented Dec. 17, 1825.
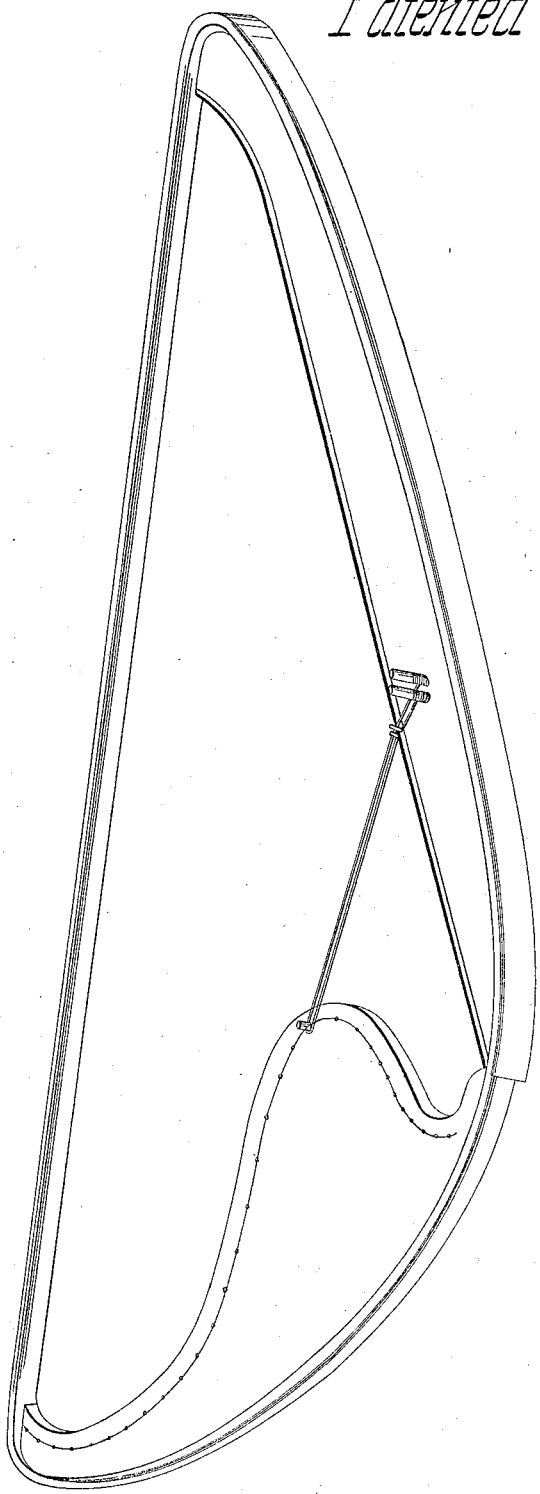
AM. PHOTO-LITHO. CO. N.Y. (OSBORNE'S PROCESS)

Missing
Page